United States Patent [19]

Howard et al.

[11] Patent Number: 4,541,689
[45] Date of Patent: Sep. 17, 1985

[54] FRICTION WEDGE ALIGNMENT SYSTEM FOR LASER DIODE COLLIMATOR PENS

[75] Inventors: P. Guy Howard; Roeland M. T. Hekker, both of Colorado Springs, Colo.

[73] Assignee: Optical Storage International, Minneapolis, Minn.

[21] Appl. No.: 533,395

[22] Filed: Sep. 19, 1983

[51] Int. Cl.⁴ .............................................. G02B 7/02
[52] U.S. Cl. ................................... 350/255; 340/707; 350/245; 350/252
[58] Field of Search ....................... 235/472; 340/707; 350/252, 253, 245, 237

[56] References Cited

U.S. PATENT DOCUMENTS 4,431,267  2/1984  Finck et al. .......................... 350/252

Primary Examiner—John K. Corbin
Assistant Examiner—William Propp
Attorney, Agent, or Firm—Edward P. Heller, III; Joseph A. Genovese

[57] ABSTRACT

A wedge/taper alignment ring is used to hold the objective lens of a laser light pen in place. The ring is free to move in the axial direction under forces of thermal expansion and shock, decreasing distortion and misalignment to the objective. Moreover, it centers the mechanical axis of the objective to that of the housing. A spring with a high restoring force moves the ring back into place.

2 Claims, 4 Drawing Figures

FRICTION WEDGE ALIGNMENT SYSTEM FOR LASER DIODE COLLIMATOR PENS

BACKGROUND OF THE INVENTION

1. Field of the Invention

The invention relates generally to the field of aligning an objective lens within a cylinder and more particularly to alignment means for the objective lens.

2. Brief Description of the Prior Art

Prior laser light pens captured the objective lens between two rings, substantially as shown in FIG. 1. Precision alignment techniques were used to position the objective 10 relative to the laser light source at 12. This included movement of the objective left to right in the figure. The spring 14 in the figure held the lens in position while a laser welder welded rings 16 and 17 in place.

A problem was presented by welding the rings in place. The body 18 holding the objective lenses is composed of a material such as a polycarbonate. The body 20 of the light pen is composed of a metal such as aluminum. The coefficients of thermal expansion of the two materials are different. When the light pen heats up during operation, this differential in coefficients causes warping of the objective lense body 18. This in turn causes either rotational or longitudinal misalignment of the objective lenses themselves. Further, the warping can cause the lenses to become loose and misoriented relative to the optical axis of the pen.

Another problem with the fixed ring system is that on mechanical shock, there is no cushioning effect, thus decreasing the tolerable level of shock.

A third problem involved the necessary tolerance between the objective body and the pen body. This tolerance allowed radial movement relative to the optical axis on thermal expansion or shock.

SUMMARY OF THE INVENTION

The invention essentially comprises replacing the rear ring in FIG. 1 with a wedge/taper ring as shown in FIG. 2. The rear end of the objective lens body is tapered to fit into the wedge. The spring force of spring 14 has been substantially increased.

The force of the spring 14 on the wedge forces the wedge on the tapered end of the objective body. This in turn causes the wedge to expand and create frictional contact with the interior surface of the pen body. However, the wedge is not welded and is free to move on necessity such as with thermal expansion or with mechanical shock. The spring force restores the wedge and objective to position after these forces are gone.

One surprising feature of the invention is that the frictional force of the wedge against the pen body depends on the amount of force on the taper. Thus during conditions of shock, the frictional force greatly increases, retarding and damping the rearward movement of the objective lens. However, when the shock force is released, or the lens begins movement to the right, the damping force decreases permitting the spring to restore the objective lens to its proper position.

Additionally, the mating of the tapers prevents radial movement of the objective lenses. It actually centers the mechanical axis of the objective to the mechanical axis of the laser pen housing.

DESCRIPTION OF THE PREFERRED EMBODIMENT

Figure 1:
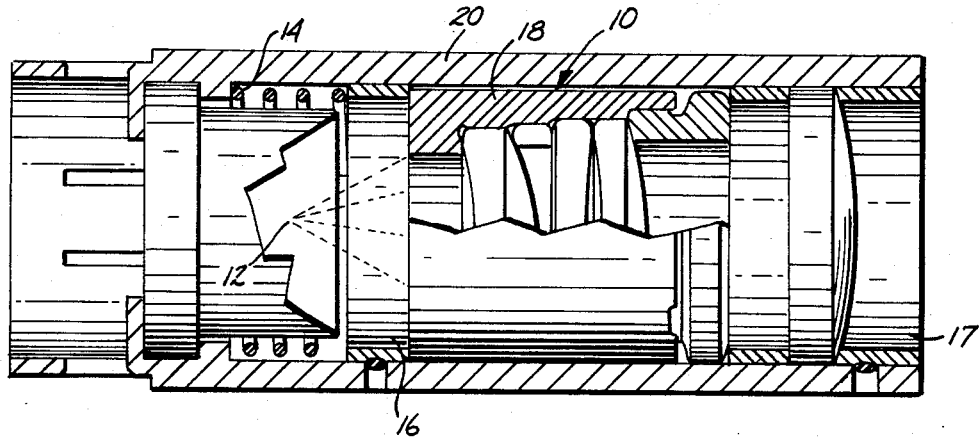
FIG. 1 shows a light pen and its objective alignment means according to the prior art.
Figure 2:
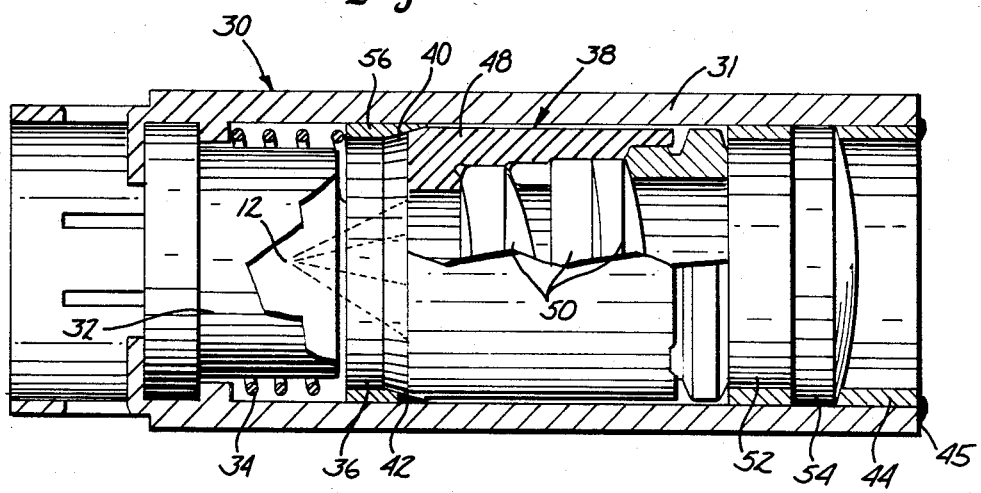
FIG. 2 shows a light pen and its objective alignment means according to the invention.

Referring to FIG. 2, a laser light pen is shown generally at 30. It comprises a cyclindrical pen body 31 of a metal such as aluminum. Mounted interior the cylindrical pen body are a source of laser light 32, which in the preferred embodiment is a laser diode; an objective lens 38 comprising a body composed of a polycarbonate 48 and lenses 50; a front objective ring 52; another lens 54 and a retaining ring 44, which is laser welded to the pen body 31.

Figure 3A:
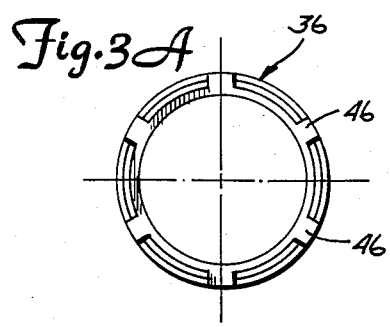
FIGS. 3a and 3b show the construction of the tapered wedge.
Figure 3B:
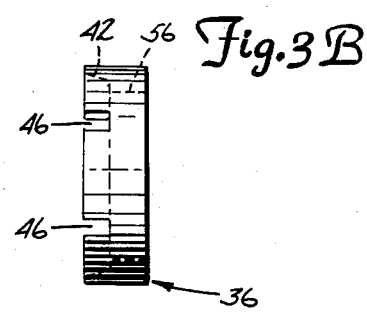

Also mounted in the cylinder of the pen body 31 are features of the present invention: spring 34 and wedge/taper ring 36, shown in greater detail in FIGS. 2, 3a and 3b. This ring 36 comprises a "rearward" portion 56 of a relatively constant thickness and diameter. It comprises a "forward" portion 42 having a tapered surface.

The "rearward" portion 40 of the objective lens body 48 is tapered similarly to the taper of the "forward" portion of the ring 36, and is adapted to mate therewith. Rearward movement or force from the objective lens on the ring 36, if initially resisted by the ring, will cause the tapered portion of the ring to expand and press against the interior wall of pen body 31. Joints 46 assist this expansion. This causes friction to occur between the ring 36 and the body 31 which resists this movement and tends to hold the ring 36 in position.

Spring 36 has considerable more restoring force than those springs of the prior art whose only purpose was to assist in alignment of the objective lens during assembly. This spring places considerable force on the wedge/taper ring 36 to force it against the tapered portion 40 of the objective lens body 48. This is designed to cause the wedge/ring to expand into frictional contact with pen body 31 under normal circumstances.

Assembly of the laser light pen and objective lens alignment is similar to that of the prior art save that the step of welding the alignment ring to the pen body is eliminated.

During operation, as the heat of the laser causes expansion of the elements of the pen, any differential in coefficients of expansion are accommodated by the wedge/taper ring which is free to slide in the pen body under such forces. The spring 34 will restore the wedge/ring 36 to its proper position if the relative movement was to the left in the Figure. If the materials chosen exhibit the opposite relative movement, the retaining ring 16 would move to the left in the Figure faster than the lens body 18. This would leave the lens body free to move and rotate as it would no longer be captured. This effect is eliminated in the present invention, as the wedge/ring follows the objective lense body 38 under force of spring 34.

And finally, in cases of shock, the freedom of movement of the wedge/taper ring 36 and the presence of spring 34 provide a shock absorber effect, permitting higher degrees of shock to the pen. Further, the friction of the wedge/taper ring 36 dampens oscillation of the spring mass system of spring 34 and objective lens 38.

The specification of the elements of the preferred embodiment should not be taken as a limitation on the scope of the appended claims, in which we claim:

1. A laser light pen objective lens alignment apparatus comprising:

a cylindrical pen body;

an objective lens housing body having a tapered end slidably mounted in said pen body;

means for limiting the freedom of movement of said objective lens housing body in a first direction;

a ring, having a tapered end adapted to mate with the tapered end of said housing body, slidably mounted in said housing body and further adapted to expand and press against the interior surface of said pen body when the tapered ends of said ring and said housing body are mated under force to create a friction force tending to maintain the position of the ring;

a spring fixedly mounted in said pen body and abutting said ring and having a sufficient restoring force to move the ring against the resistance of said frictional force.

2. The alignment apparatus of claim 1 in which said ring comprises one or more joint means at said tapered end for assisting the expansion of said ring.

* * * * *